(12) United States Patent
Zhang et al.

(10) Patent No.: US 11,644,305 B2
(45) Date of Patent: May 9, 2023

(54) TEMPERATURE INSENSITIVE DISTRIBUTED STRAIN MONITORING APPARATUS AND METHOD

(71) Applicant: MARVELL ASIA PTE, LTD., Singapore (SG)

(72) Inventors: Chunshu Zhang, San Jose, CA (US); Jie Lin, San Jose, CA (US); Masaki Kato, Palo Alto, CA (US)

(73) Assignee: MARVELL ASIA PTE LTD, Singapore (SG)

( * ) Notice: Subject to any disclaimer, the term of this patent is extended or adjusted under 35 U.S.C. 154(b) by 109 days.

(21) Appl. No.: 17/343,077

(22) Filed: Jun. 9, 2021

(65) Prior Publication Data

US 2022/0397388 A1 Dec. 15, 2022

(51) Int. Cl.
*G02B 6/12* (2006.01)
*G01B 11/16* (2006.01)
*H04B 10/079* (2013.01)

(52) U.S. Cl.
CPC ........ *G01B 11/161* (2013.01); *G02B 6/12007* (2013.01); *H04B 10/07955* (2013.01); *G02B 2006/12159* (2013.01); *G02B 2006/12164* (2013.01)

(58) Field of Classification Search
None
See application file for complete search history.

(56) References Cited

U.S. PATENT DOCUMENTS

| 5,289,256 A * | 2/1994 | Gramling | G01D 5/266 356/477 |
| 2004/0067001 A1 | 4/2004 | Vodrahalli et al. | |
| 2016/0173221 A1 | 6/2016 | Kato | |
| 2016/0356708 A1* | 12/2016 | Bennett | G02F 1/0147 |

FOREIGN PATENT DOCUMENTS

WO  WO-02103418 A2  12/2002

OTHER PUBLICATIONS

International Search Report and Written Opinion for International Application No. PCT/US2021/036589 dated Mar. 2, 2022.

* cited by examiner

*Primary Examiner* — Chad H Smith

(57) ABSTRACT

An apparatus for monitoring strain in an optical chip in silicon photonics platform. The apparatus includes a silicon photonics substrate shared with the optical chip. Additionally, the apparatus includes an optical input configured in the silicon photonics substrate to supply an input signal of a single wavelength. The apparatus further includes a first waveguide arm and a second waveguide arm embedded in the silicon photonics substrate to form an on-chip interferometer. The second waveguide arm forms a delay line being disposed at a region in or adjacent to the optical chip. The on-chip interferometer is configured to generate an interference pattern serving as an indicator of strain distributed at the region in or adjacent to the optical chip. The interference pattern is caused by a temperature-independent phase shift at the single wavelength of the interferometer between the first waveguide arm and the second waveguide arm.

18 Claims, 8 Drawing Sheets

Table 1: Exemplary parameters on three SiPho waveguides for 1550nm TE0 mode

| | WG refractive index | TO coefficient (/K) | $n_{eff}$ (45C) | $dn_{eff}/dT$ (/K) | WG size (w x H) (nm) | Normalized length (um) |
|---|---|---|---|---|---|---|
| SWG (Strip Waveguide) | 3.478 | $1.8 \times 10^{-4}$ | 2.355 | $1.199 \times 10^{-4}$ | 450 x 220 | 100.000 |
| RWG (Ridge Waveguide) | 3.478 | $1.8 \times 10^{-4}$ | 2.569 | $8.937 \times 10^{-5}$ | 450 x 220 8000 x 110 (slab) | 134.161 |
| NWG (Nitride Waveguide) | 1.99 | $4.5 \times 10^{-5}$ | 1.994 | $7.475 \times 10^{-6}$ | 800 x 400 | 1603.5 |

FIG. 2

Table 2: The properties of three materials used on SiPho wafer

|  | B1 (/Pa) | B2 (/Pa) | Poisson number (Gpa) | Young's Modulus (Gpa) |
|---|---|---|---|---|
| Silica (SiO$_2$) | 4.22e$^{-12}$ | 0.65e$^{-12}$ | 0.164 | 76 |
| Silicon | 4.04e$^{-12}$ | -11.04e$^{-12}$ | 0.27 | 180 |
| SiN | 2.36e$^{-12}$ | -0.35e$^{-12}$ | 0.23 | 295 |

FIG. 3

TEMPERATURE INSENSITIVE DISTRIBUTED STRAIN MONITORING APPARATUS AND METHOD

CROSS-REFERENCE TO RELATED APPLICATIONS

None.

FIELD OF THE INVENTION

The present disclosure relates to a silicon-photonics device. More particularly, the present disclosure provides an apparatus and a method for monitoring distributed strain in an optical chip in silicon photonics platform.

BACKGROUND

Over the last few decades, the use of broadband communication networks exploded. In the early days Internet, popular applications were limited to emails, bulletin board, and mostly informational and text-based web page surfing, and the amount of data transferred was usually relatively small. Today, Internet and mobile applications demand a huge amount of bandwidth for transferring photo, video, music, and other multimedia files. For example, a social network like Facebook processes more than 500 TB of data daily. Over the past few years, there has been a global explosion in bandwidth demand. Increasingly high demands for data and data transfer have been driving improvements in existing data communication systems to address these needs for increased data and data transfer.

Integrated silicon photonics (SiPho) platform solutions have an intrinsic advantage over conventional packaging solutions at ever increasing baud rates. Silicon-based photonics integrated circuits have also become very popular, because of their compatibility with mature CMOS (complementary metal—oxide—semiconductor) technologies with excellent processing control, low-cost and high-volume processing. Integration technology is attractive where space and power savings are critical. Co-packaged optics (CPO), or in-package optics (IPO) is one of those technologies. Bringing optics and switch silicon together in the same package creates a synergy between once disjoint and independent technologies thereby saving significant power.

For example, optical chip in SiPho platform solutions have drive electronics and lasers heterogeneously integrated on the same Si-based substrate, forming a light engine chiplet consisting of a silicon photonics substrate with optical components, heterogeneously integrated with lasers, and modulator driver, transimpedance amplifier (TIA), etc. Normally, additional materials, such as Cu—Ni—SnAg, CuNiAu, etc, need to be plated or attached together under high temperature environment to form pads on the silicon photonics chip, laser, TIA and driver for forming the integrated light engine chiplet. The optical chip device fabrication process including material plating and attaching process would introduce additional stress and force, which cause the deformation of the silicon photonic substrate, and degradation in performance of optical components on the SiPho platform, for instance because of drift. Temperature variance can also cause SiPho device performance drift, which can be difficult to distinguish from strain-caused performance degradation. These problems are difficult to mitigate at least partly due to lack of sensitive direct monitoring of strains distributed amongst optical chips manufactured in SiPho process.

BRIEF SUMMARY OF THE INVENTION

The present disclosure relates to silicon photonics device. More particularly, the present disclosure provides apparatus for monitoring strain at integrated optical chip device, or distributed among several integrated optical chip devices, in silicon photonics platform. The apparatus is based on an interferometer, such as a Mach-Zehnder interferometer (MZI), which is embedded in a same wafer or reticle of SiPho dies and configured to perform direct on-chip monitoring of distributed strains at plural locations of the optical chip/reticle/wafer. In some implementations the interferometer is configured to be temperature insensitive. Other applications are possible.

In an embodiment, the present disclosure provides an apparatus for monitoring strain on in an optical chip in silicon photonics platform. The apparatus includes a silicon photonics substrate shared with the optical chip. Additionally, the apparatus includes an optical input configured in the silicon photonics substrate to supply an input signal of a single wavelength. The apparatus further includes a first waveguide arm and a second waveguide arm embedded in the silicon photonics substrate to form an on-chip interferometer. The second waveguide arm forms an optical delay line and is disposed at a region in or adjacent to the optical chip The on-chip interferometer is configured to (i) split the input signal into a first output input signal in the first waveguide arm and a second output input signal in the second waveguide arm, (ii) combine the first input signal and the second input signal into a combined signal exhibiting an interference pattern indicative of strain at the region in the optical chip.

In the embodiment, the apparatus further includes a 1×2 coupler being configured as an input beam splitter of the on-chip interferometer for splitting the input signal respectively to the first input signal in the first waveguide arm and the second input signal in the second waveguide arm with a substantially ~50% split ratio.

In the embodiment, the apparatus further includes a 2×2 coupler configured as an output beam splitter of the on-chip interferometer that is configured to receive the first input signal from the first waveguide arm and to receive the second input signal from the second waveguide arm to form the combined signal and to output a first output signal in a first output branch and to output a second output signal in a second output branch, both the first output signal and the second output signal depending on the interference pattern caused by a phase shift between the first input signal and the second input signal.

In the embodiment, the apparatus further includes a second photo detector coupled to the first output branch to measure a power of Poo of the first output signal and a third photo detector coupled to the second output branch to measure a power of Poi of the second output signal. The apparatus outputs an indication of strain that is distributed along the second waveguide arm at the region in or adjacent to the optical chip.

In the embodiment, the first waveguide arm includes a silicon-based waveguide of a first length and the second waveguide arm includes a SiN-based waveguide of a second length disposed closer to the optical chip than the first waveguide arm. The second length is selected to achieve an athermal interference condition at the single wavelength of the input signal with respective to the silicon-based waveguide of the first length so that the phase shift between the first input signal in the first waveguide arm and the second input signal in the second waveguide arm of the on-chip interferometer is temperature independent.

In an alternative embodiment, the present disclosure provides an apparatus for monitoring strains in an optical chip in silicon photonics platform. The apparatus includes a silicon photonics substrate shared with the optical chip. The apparatus further includes an optical input configured in the silicon photonics substrate to supply an input signal in multiple (n) wavelengths. Additionally, the apparatus includes a first waveguide arm embedded in the silicon photonics substrate and a second waveguide arm including multiple (n) optical paths embedded in the silicon photonics substrate at different regions in the optical chip to form an on-chip interferometer with the first waveguide arm between a first beam splitter and a second beam splitter. The first beam splitter is configured to split the input signal to a first input signal in the first waveguide arm and a second input signal in the second waveguide arm. The second beam splitter is configured to recombine the first input signal and the second input signal to a combined signal and split the combined signal to a first output signal and a second output signal resulted from different interference patterns respectively at the multiple (n) wavelengths. Furthermore, the apparatus includes a first Demultiplexer (DeMux) device configured in the silicon photonics substrate disposed between the first beam splitter and the multiple (n) optical paths to demultiplex the second input signal in the second waveguide arm into multiple (n) demultiplexed input signals respectively carrying the multiple (n) wavelengths to the multiple (n) optical paths. Moreover, the apparatus includes a second DeMux device configured in the silicon photonics substrate disposed between the second beam splitter and multiple (n) output ports to demultiplex the second output signal in the second output branch to multiple (n) demultiplexed output signals at the multiple (n) output ports respectively carrying the multiple (n) wavelengths. The multiple (n) optical paths in the second waveguide arm are disposed separately as respective optical delay lines of the on-chip interferometer under respective athermal interference conditions for generating the different interference patterns respectively at the multiple (n) wavelengths to indicate strains distributed at the different regions in or adjacent to the optical chip.

In yet another alternative embodiment, the present disclosure provides a method for monitoring strain in an optical chip in silicon photonics platform. The method includes preparing a silicon photonics substrate for integrating the optical chip. The method further includes configuring an optical input in the silicon photonics substrate to supply an input signal of a single wavelength. Additionally, the method includes embedding a first waveguide arm and a second waveguide arm at least partially in the silicon photonics substrate to form an on-chip interferometer. The second waveguide arm forms an optical delay line and is disposed at a region in or adjacent to the optical chip. The on-chip interferometer is configured to (i) split an input signal into a first input signal in the first waveguide arm and a second input signal in the second waveguide arm, (ii) combine the first input signal and the second input signal into a combined signal exhibiting an interference pattern indicative of strain at the region in the optical chip.

In still another alternative embodiment, the present disclosure provides a method for monitoring strains in an optical chip in silicon photonics platform. The method includes preparing a silicon photonics substrate for integrating the optical chip. The method further includes configuring an optical input in the silicon photonics substrate to supply an input signal in multiple (n) wavelengths. Additionally, the method includes embedding a first waveguide arm in the silicon photonics substrate. The method further includes embedding a second waveguide arm including multiple (n) optical paths at least partially in the silicon photonics substrate at different regions in the optical chip to form an on-chip interferometer with the first waveguide arm between a first beam splitter and a second beam splitter. The first beam splitter is configured to split the input signal to a first input signal in the first waveguide arm and a second input signal in the second waveguide arm. The second beam splitter is configured to recombine the first input signal and the second input signal to form a combined signal exhibiting different interference patterns respectively at the multiple (n) wavelengths and split to a first output signal and a second output signal. Furthermore, the method includes configuring a first Demultiplexer (DeMux) device in the silicon photonics substrate disposed between the first beam splitter and the multiple (n) optical paths to demultiplex the second input signal in the second waveguide arm into multiple (n) demultiplexed input signals respectively carrying the multiple (n) wavelengths to the multiple (n) optical paths. Moreover, the method includes configuring a second DeMux device in the silicon photonics substrate disposed between the second beam splitter and multiple (n) output ports to demultiplex the second output signal in the second output branch to multiple (n) demultiplexed output signals at the multiple (n) output ports respectively carrying the multiple (n) wavelengths. The multiple (n) optical paths in the second waveguide arm are disposed separately as respective optical delay lines of the on-chip interferometer under respective athermal interference conditions for generating the different interference patterns respectively at the multiple (n) wavelengths to indicate strains distributed at the different regions in or adjacent to the optical chip.

The present disclosure achieves these benefits and others in the context of disclosed apparatus as a device-on-chip on a silicon photonics substrate. A further understanding of the nature and advantages of the present disclosure may be realized by reference to the latter portions of the specification and attached drawings.

BRIEF DESCRIPTION OF THE DRAWINGS

The following diagrams are provided as non-limiting examples, it is noted that there are many other variations, modifications, and alternatives. Similarly, the examples and embodiments described herein are for illustrative purposes only and that various modifications or changes in light thereof will be apparent.

FIG. 2 is Table 1 showing examples of parameters on three SiPho waveguides at wavelength of 1550 nm in TE0 polarization mode for implementing an embodiment of the present disclosure.

FIG. 3 is Table 2 showing the properties of three materials used on a SiPho wafer for implementing an embodiment of the present disclosure.

DETAILED DESCRIPTION OF THE INVENTION

The present disclosure relates to silicon photonics device. More particularly, in an embodiment, the present disclosure provides a temperature insensitive apparatus for monitoring strain in an integrated optical chip device, or strain distributed among several optical chip devices, in a silicon photonics platform. In an embodiment, the apparatus is based on an interferometer, such as a Mach-Zehnder interferometer (MZI), which is embedded in a same wafer or reticle of SiPho dies for performing monitoring of distributed strains at many locations of the optical chip/reticle/wafer. In an embodiment, the monitoring of distributed strains, is insensitive to variations in temperature among different components in the SiPho platform. Other applications are possible.

In the present disclosure, solutions to monitor strains distributed at different regions in an optical chip in silicon photonics platform are provided. The following description is presented to enable one of ordinary skill in the art to make and use the disclosed apparatus and to incorporate it in the context of particular applications. Various modifications, as well as a variety of uses in different applications will be readily apparent based on the disclosure and teachings provided herein, and the general principles defined herein may be applied to a wide range of embodiments.

Figure 1:
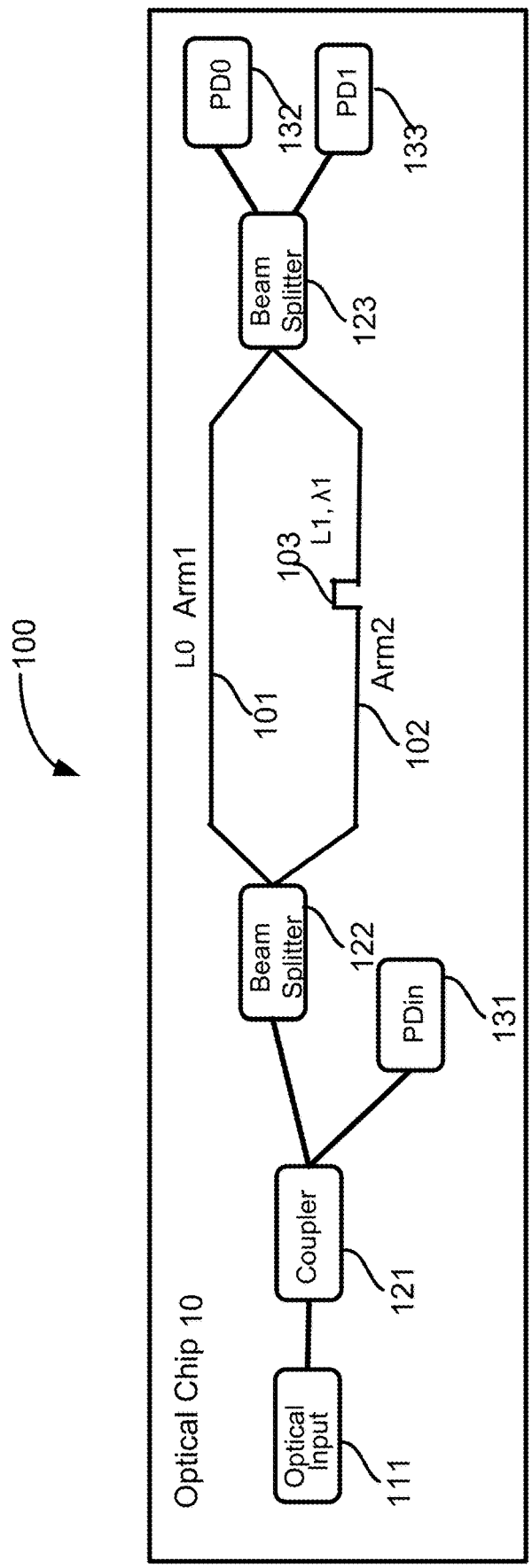
FIG. 1 is a schematic diagram of an apparatus for monitoring strains on an optical chip in silicon photonics platform according to an embodiment of the present disclosure.

FIG. 1 is a schematic diagram of an example apparatus for monitoring strains on an optical chip in silicon photonics platform according to an embodiment of the present disclosure. As seen in FIG. 1, a monitoring apparatus 100 is provided in the same optical chip 10 in silicon photonics platform for monitoring strains distributed at one or more regions in or adjacent to the optical chip 10. In the embodiment, the optical chip 10 shares a same silicon photonics substrate with the monitoring apparatus 100. In a particular embodiment, the monitoring apparatus 100 is configured in the silicon photonics substrate as other silicon photonics (SiPho) components used in optical dies on the optical chip 10, though those other SiPho components are not shown in FIG. 1.

Referring to FIG. 1, the monitoring apparatus 100 includes an optical input 111 configured in the silicon photonics substrate shared with the optical chip 10. The optical input 111 is configured to provide an input signal with a single wavelength ($\lambda_1$) for the monitoring apparatus 100. In an embodiment, the optical input 111 is provided as an edge coupler coupled to a single wavelength light source (not shown) integrated or mounted on the optical chip 10. In another embodiment, the optical input is provided as a surface grating coupler coupled to single wavelength light source external to the optical chip 10. A single wavelength light signal, for example, is generated by a laser illumination source and delivered as an input signal through the edge coupler or the surface grating coupler to the optical input 111 in the silicon photonics substrate. As a power ratio will be used by the monitoring apparatus 100 to output an indication of strain, a power Pin of the input signal is measured. For measuring the power of the input signal the monitoring apparatus 100 includes a first coupler 121, which is a 1×2 coupler configured as a silicon-based multimode interference (MMI) coupler or a Directional Coupler (DC) in the silicon photonics substrate. The first coupler 121 has its input port connected to the optical input 111 to receive the input signal and a major output port for delivering the input signal and a minor output port connected to a first photodiode PDin 131 for measuring the power Pin of the input signal.

Referring further to FIG. 1, the monitoring apparatus 100 includes a first waveguide arm 101 and a second waveguide arm 102 embedded in the silicon photonics substrate that is shared with the optical chip. For example, a Si waveguide is formed by etching the silicon photonics substrate to form a Si structure with certain width, height, and length in a shape such as rectangle or ridge on flat base. Then cladding material, usually made from an insulator such as silicon dioxide is formed around the Si structure to form the Si waveguide. The waveguide arms 101 and 102 are formed prior or substantially at the same time for fabricating the optical chip 10 by integrating multiple components in the same silicon photonics substrate. The first waveguide arm 101 (also referred as Arm1 in FIG. 1) and the second waveguide arm 102 (also referred as Arm2) are formed between a first beam splitter 122 and a second beam splitter 123 to form a Mach-Zehnder interferometer (MZI) with the second waveguide arm 102 provided as a delay line formed at a region near or in the optical chip 10. Optionally, the Arm2 102 is formed adjacent to the optical chip 10. Optionally, the Arm2 102 is formed more closer to the optical chip 10 than the Arm1 101. The Arm1 101 is characterized by a first effective refractive index $n_{\it{eff}1}$ and a first length $L_0$. The Arm2 102 is characterized by a second effective refractive index $n_{\it{eff}2}$ and a second length $L_1$. The bump 103 in the Arm2 102 is used to show the delay line feature schematically. In terms of the primary design of the MZI, the first beam splitter 122 is provided to have an optical input signal of the single wavelength $\lambda_1$ split to two input signals respectively into the Arm1 and the Arm2. When the Arm2 relative to Arm1 is properly configured as an optical delay line, the MZI yields a certain phase-delay shift at the single wavelength $\lambda_1$ to satisfy an optical interference condition: $m\lambda = n_{\it{eff}2}L_1 - n_{\it{eff}1}L_0$, where $\lambda = \lambda_1$ and m is an integer for constructive interference or a half-integer for destructive interference. The second beam splitter 123 is provided to recombine the first input signal and the second input signal to form a combined signal exhibiting an interference pattern. The second beam splitter 123 is also configured to split the combined signal to a first output signal and a second output signal. Optionally, the first output signal exhibits constructive interference and the second output signal exhibits destructive interference that vary with the phase shift between the two split input signals under the optical interference condition. The phase shift will be changed due to the environmental changes such as temperature and strain along the waveguide arms. Thus, when the phase shift is made to be temperature independent at an athermal interference condition, the interference pattern provides a direct indication of strain distributed at the region in the optical chip.

Referring to FIG. 1 again, the monitoring apparatus 100 includes a second coupler 122 configured in the silicon photonics substrate to serve the first beam splitter at the common input port of the MZI. The first beam splitter is a 1×2 coupler having one input configured to receive the input signal from the optical input 111 via the major output port of the first coupler 121 and two outputs for splitting the power of the input signal with a substantially 50% split ratio respectively into the Arm1 101 and the Arm2 102. Optionally, in various embodiments, the second coupler 122 is a multimode interference coupler or a directional coupler formed in the silicon photonics substrate. The monitoring apparatus 100 further includes a second beam splitter 123 configured at the common output port of the MZI in the silicon photonics substrate. The second beam splitter 123 is a 2×2 coupler with two inputs respectively connected to the Arm1 101 and the Arm2 102 (as a delay line) to receive the first input signal in the first waveguide arm 101 and the second input signal in the second waveguide arm 102 to generate a combined signal. The 2×2 coupler with two outputs for outputting respectively the first output signal and the second output signal. Optionally, the 2×2 coupler 123 is a multimode interference coupler or a directional coupler formed in the silicon photonics substrate.

Because a strain (or stress) in a material can induce refractive index change through photo-elastic effect, in the embodiment, the monitoring apparatus 100 utilizes the interference condition of MZI set by the delay line of Arm2 102 to gauge or monitor a distributed strain F in the Arm2. In particular, as the Arm2 102 can be disposed in any designated region in or adjacent to the optical chip, the monitoring apparatus 100 effectively monitors the distributed strain at any designated location on the optical chip. However, the refractive index change of the MZI material also can be induced by temperature based on thermo-optic effect. In the embodiment, an athermal interference condition of MZI, i.e., $d\lambda/dT=0$, can be realized by setting the following term to zero:

$$\frac{dn_{eff2}}{dT}L_1 - \frac{dn_{eff1}}{dT}L_0 = 0,$$

to have a temperature-independent phase shift. This is achieved by optimizing the second length $L_1$ of the Arm2 102 as the Arm1 is prefixed to balance thermo-optic effect between the two arms. In reality, this athermal interference condition is achieved approximately due to manufacture variations of the Arm1 and Arm2 embedded in the silicon photonics substrate. Major manufacture variations come from difficulty in controlling the width or height of the waveguide arm structure in nanometer scale during the etching process.

In addition, stresses can cause anisotropic and inhomogeneous distribution of the refractive index. In a waveguiding material the refractive index change, $\Delta n$, for the x and y-direction as a function of applied stress, $\sigma$, is given by:

$$\Delta n_i = n_i - n_0$$
$$= -B_2\sigma_t - B_1(\sigma_j + \sigma_k)$$
$$= \frac{x}{R}(-B_2 C_{12} - B_1(C_{12} + C_{11})),$$

where $B_1$ and $B_2$ are stress-optic coefficients and the elastic coefficients $C_{11}$ and $C_{12}$ can be expressed by Poisson number $v$ and Young's modulus $E$ of corresponding materials in the waveguide arm:

$$C_{11} = \frac{E(1-v)}{(1+v)(1-2v)},$$

$$C_{12} = \frac{Ev}{(1+v)(1-2v)}.$$

Under the athermal interference condition, strains (Γ) from external source or inherent due to integrated SiPho components in the optical chip become a substantial cause to the effective refractive index change $dn_{eff}/d\Gamma$ and corresponding interference spectrum change $d\lambda/d\Gamma$. Therefore, the monitoring apparatus 100 of the present disclosure provides direct a temperature-insensitive detection of the distributed strain-induced phase shift due to photo-elastic effect but not temperature induced change due to thermo-optic effect. Additionally, since the Arm2 102 of the MZI can be laid at any designated location on the optical chip 10, the distributed strain monitoring of the optical chip is achieved.

In the embodiment, in order to enhance sensitivity of detecting an interference spectrum change $d\lambda/d\Gamma$ due to the photo-elastic effect, different materials with different properties at specific wavelength and guided mode of the optical signal are selected for the two arms of the MZI to enlarge the phase shift response. FIG. 2 shows a table (Table 1) of exemplary parameters of refractive indices and thermo-optic coefficients on three types of waveguides at wavelength of 1550 nm in TE0 polarization mode for implementing an embodiment of the present disclosure. A first type of waveguide is a strip waveguide, namely it is referred as SWG. SWG has a rectangular shaped cross-section. A second type of waveguide is a ridge waveguide also made by silicon material, called RWG. RWG has a narrower width on top of a wider slab. Other than the cross-section shape difference, RWG also is made by silicon material. Yet, difference in shape still causes some differences in effective refractive index and its temperature derivative. A third type of waveguide is a SiN waveguide in strip shape, referred as NWG. Because of use of different material, NWG shows much bigger differences in refractive indices and thermo-optic coefficients, comparing to SWG and RWG. In an example, the waveguide sizes (width×height) given for the SWG is 450×220 (nm) in cross-section and 100 μm in length. For the RWG, the waveguide size is given as a 450×220 (nm) ridge (width×height) on an 800×110 (nm) slab (width×height) in cross-section plus a 134.161 μm in length that is normalized to the SWG's length of 100 μm to compensate the thermo-optic effect in corresponding MZI arms. For the NWG, the waveguide size is given as an 800×400 (nm) width×height cross-section plus a 1603.5 μm in length that is normalized to the SWG's length of 100 mm to compensate the thermo-optic effect in corresponding MZI arms.

FIG. 3 shows a table (Table 2) of the properties of three basic materials used on a silicon photonics wafer for implementing an embodiment of the present disclosure. The three basic materials include Silica ($SiO_2$), Silicon, and SiN. In the Table 2, the stress-optic coefficients, $B_1$, $B_2$, Poisson number $v$, and Young's modulus E are listed for the three materials. These property values are implemented in optical design simulations for optimizing structure of the MZI in the monitoring apparatus 100 based on the silicon photonics substrate according to an embodiment of the present disclosure.

Figure 4:
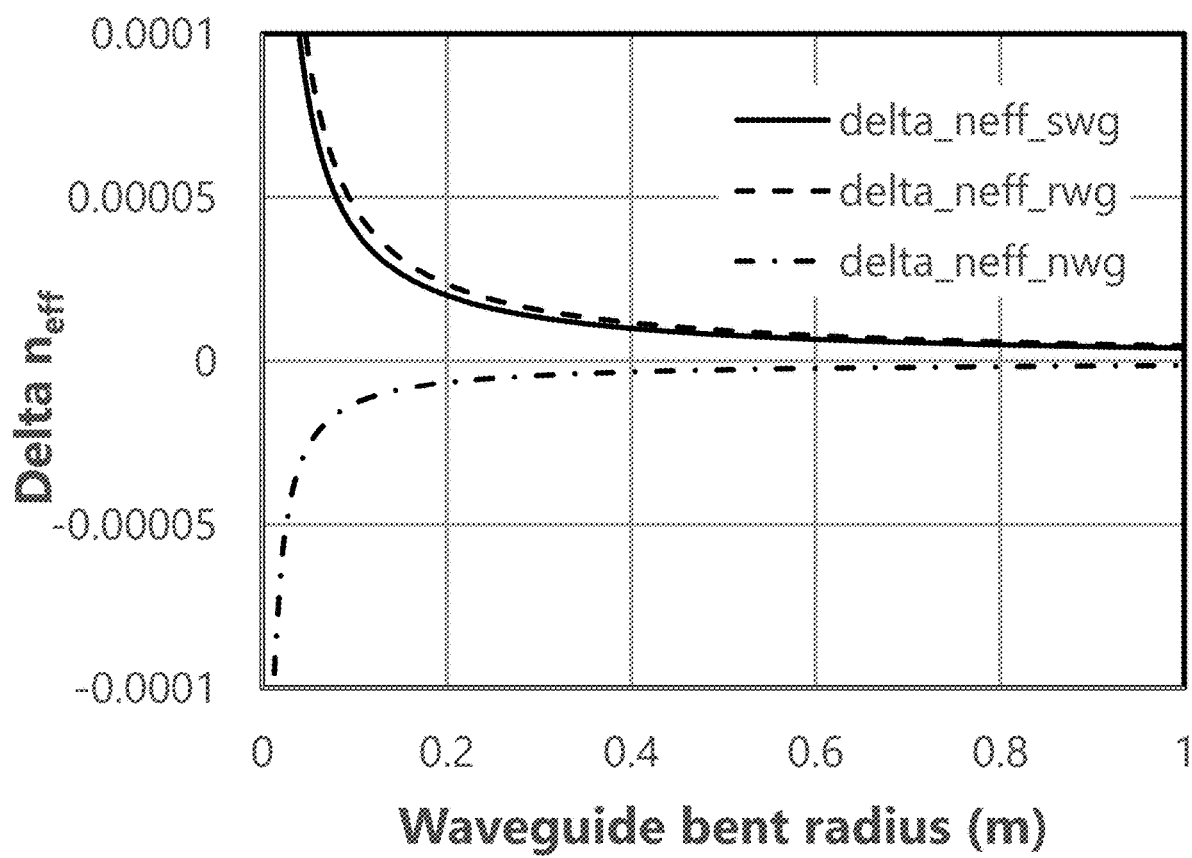
FIG. 4 is a plot of an effective refractive index change against waveguide bent radius for implementing an embodiment of the present disclosure.

FIG. 4 is a plot of an effective refractive index change against waveguide bent radius for implementing an embodiment of the present disclosure. In a simulation based on the different waveguides provided in Table 1, the effective refractive index change for each type of waveguide under different waveguide bent radius is shown. The optical signal involved in the simulation is set to a nominal TE0 polarization mode. As seen, as the waveguide bending radius becomes smaller and smaller, the effective refractive index change responds positively in both SWG (solid curve) and RWG (dashed curve) cases and very similar to each other. When the NWG is bent, the effective refractive index change responds negatively in dash-n-dot curve, opposite to those cases of SWG and RWG. This demonstrates that different materials, especially those exhibiting large differences in material properties or especially with opposite strain/stress responses, are better choice for making the two waveguide arms in the MZI for enhancing detection sensitivity of the strain monitoring apparatus.

Figure 5:
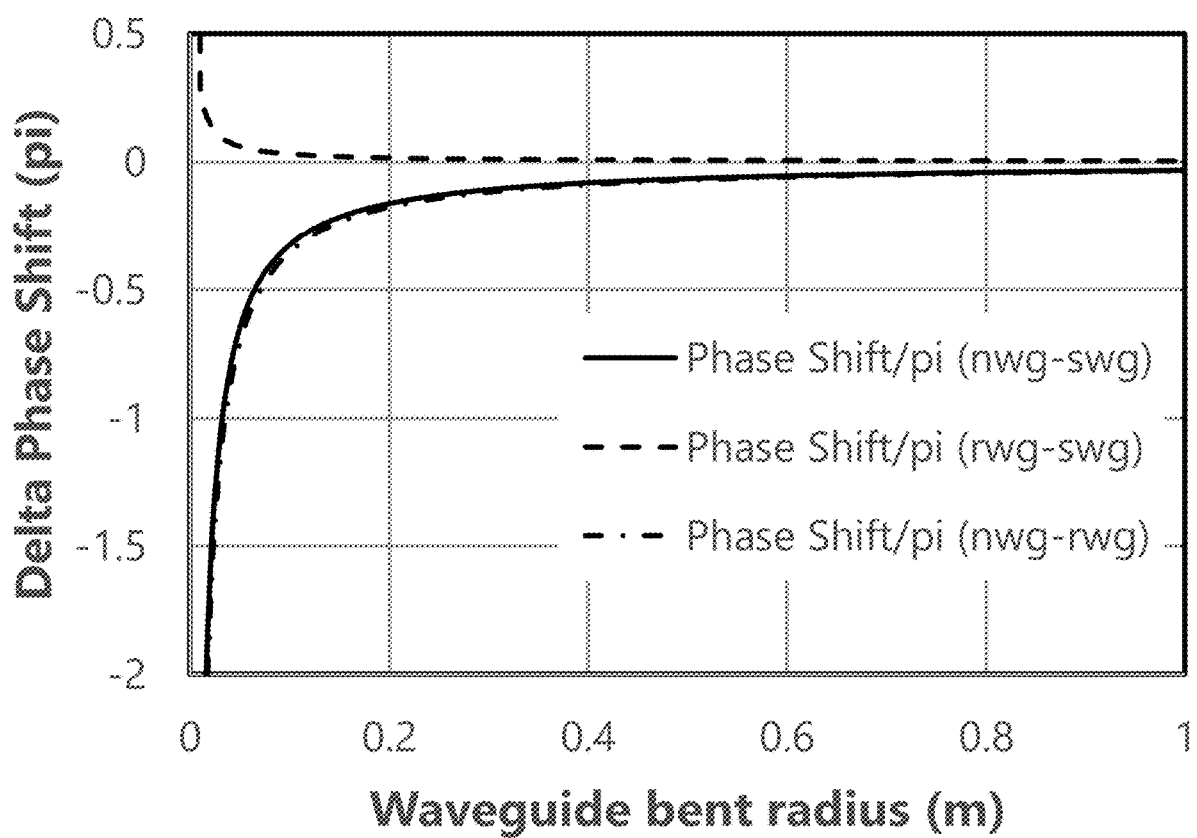
FIG. 5 is a plot of a differential phase shift on two waveguide arms of a Mach-Zehnder interferometer (MZI) for implementing an embodiment of the present disclosure.

FIG. 5 is a plot of a differential phase shift on two waveguide arms of a Mach-Zehnder interferometer (MZI) for implementing an embodiment of the present disclosure. Note, these waveguide arms are defined based on parameters given in Table 1 with optimization to achieve an athermal interference condition, i.e., $d\lambda/dT=0$. As shown, a differential phase shift on different type waveguide arms in a MZI are plotted against the waveguide bent radius. For two arms of the MZI using respective NWG and SWG types, the differential phase shift increases relatively fast and negatively as the bent radius decreases. Similar is true for two arms using respective NWG and RWG types. But for two arms using respective RWG and SWG types, the differential phase shift substantially does not change and only has a small increase positively until the bent radius becomes smaller than 0.05 m. This suggests that by using different type waveguides on MZI arms, the phase shift between the two arms of the MZI varies more significantly with the waveguide bent radius, or stain of waveguide. In other words, as two very different materials are used in the two arms of MZI, for example, SWG/RWG used for Arm1 and NWG used for Arm2, the phase shift between the two waveguide arms of the MZI will exhibit a larger value which is beneficial for achieving a higher sensitivity of the strain monitoring apparatus under the athermal interference condition for the MZI. The absolute athermal interference condition is a design target for the strain monitoring apparatus of the present disclosure. However, due to manufacture variations, the athermal interference condition is approximately achieved. Under the condition, the differences of temperature-derivative variations of optical lengths between the two waveguide arms is optimized to zero, i.e., $$\frac{dn_{eff2}}{dT}L_1 - \frac{dn_{eff1}}{dT}L_0 = 0.$$

Since a distributed strain or stress applied to either of the two waveguide arms causes a change to the effective refractive index of the corresponding waveguide arm, it thereby causes a change in phase delay between the two waveguide arms and correspondingly a change into the interference signal at the same wavelength $\lambda_1$ of the input signal. Referring to FIG. 1, the third coupler 123 is configured at the common output port to split the combined signal to the first output signal in a first output branch and the second output signal in a second output branch for the same wavelength $\lambda_1$. The power extinction ratio between the first output signal and the second output signal is determined by the phase shift induced by distributed strain. Therefore, each of the first output signal and the second output signal carries information of the differential phase shift of the two arms of MZI due to the interference. Under an athermal interference condition, when the external stress is applied to or internal stress is introduced through heavy integration of multiple SiPho components into the optical chip 10, any change of the differential phase shift induced by strain distributed along a waveguide arm (for example Arm2) is reflected in the relative power balance between the first output signal and the second output signal.

Referring to FIG. 1, the monitoring apparatus 100 further includes a second photo detector (PD0) 132 connected to the first output branch of the third coupler 123 for measuring a power $P_{o0}$ of the first output signal resulted from constructive interference and a third photo detector (PD1) 133 connected to the second output branch of the third coupler 123 for measuring a power $P_{o1}$ of the second output signal resulted from destructive interference. As strain causes changes to effective refractive index of the respective waveguide arm of the MZI, the balance between power at PD0 relative to PD1, due to relative changes in destructive and constructive interference at PD0 and PD1 respectively, will change relative to the respective powers in an unstressed MZI. In the embodiment, instead of directly using the power of each output branch, a power ratio $P_{o1}/P_{in}$ of the second output signal to the input signal, which is a normalized power of the second output signal, serves a more sensitive parameter for the monitoring apparatus 100 to detect the distributed strain along the waveguide arm. Further, a differential power ratio $(P_{o1}-P_{o0})/P_{in}$ of a difference between the second output signal and the first output signal to the input signal also provides sensitive detection of the distributed strain in the delay line waveguide arm (usually the second waveguide arm 102 is the delay line to provide a phase shift) disposed at a designated region in or adjacent to the optical chip 10, which provides a directly monitoring on strain distributed along the second waveguide arm 102 at the designated region in or adjacent to the optical chip in the silicon photonics platform. In an embodiment, the monitoring apparatus of the present disclosure monitors both the strain strength and the deformation regions in the chips on a silicon photonics substrate.

Referring to FIG. 1, each of the first photo detector 131, the second photo detector 132, the third photo detector 133 in the monitoring apparatus 100 can be a photodiode. Each of the above photo detectors can be replaced by other type of photo detector. For example, each photo detector may be an edge coupler or surface grating coupler configured to couple the corresponding optical signal to an detector or power meter external to the silicon photonics substrate.

Figure 6:
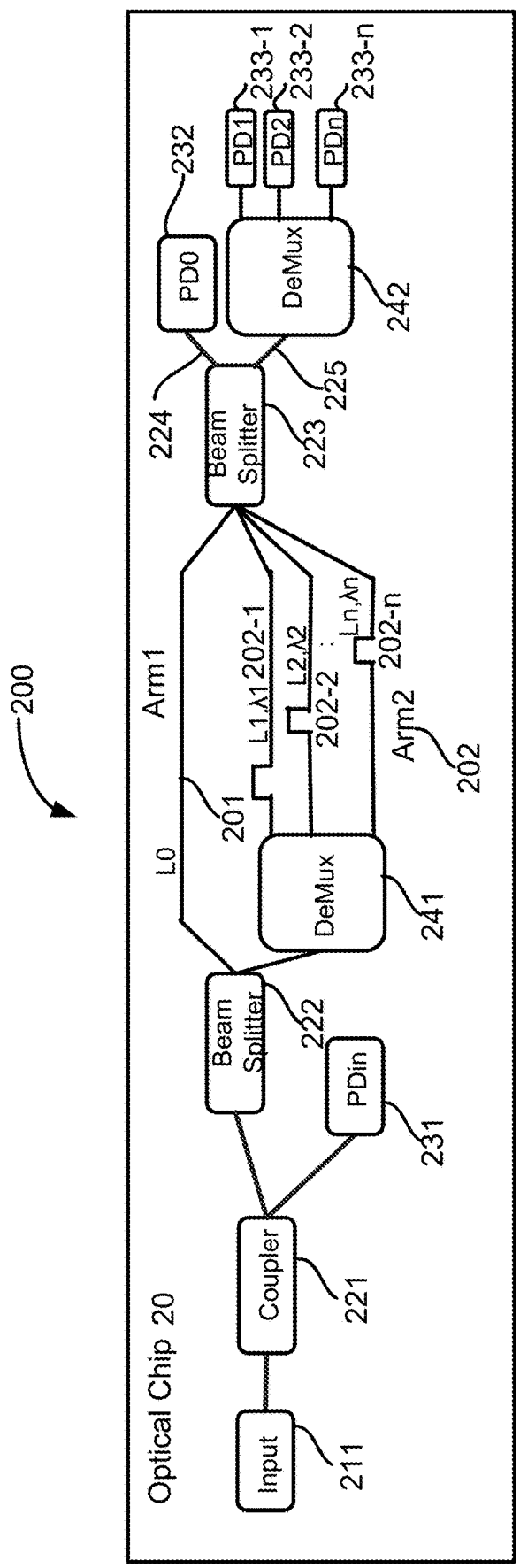
FIG. 6 is a schematic diagram of an apparatus for monitoring strains on an optical chip in silicon photonics platform according to another embodiment of the present disclosure.

FIG. 6 is a schematic diagram of another example apparatus for monitoring strains on an optical chip in silicon photonics platform according to another embodiment of the present disclosure. As seen, the apparatus 200 for monitoring strains is configured in a silicon photonics substrate shared with an optical chip 20. The apparatus 200 includes an optical input 211 configured to supply a multi-wavelength input signal. The apparatus further includes a first coupler 221 having an input connected to the optical input 211, a major output for delivering the input signal and a minor output tapping out a small portion of a power $P_{in}$ of the input signal. In alternative embodiments, minor output is coupled to a photo detector $P_{in}$ 231 which is a photodiode for reading the power $P_{in}$ or to a coupler configured to couple optical signal to an external detector or power meter for measuring the power.

In the embodiment shown in FIG. 6, the apparatus 200 further includes a Mach-Zehnder Interferometer (MZI) configured in the silicon photonics substrate having a first waveguide arm 201 and a second waveguide arm 202 with a delay line disposed between a common input port and a common output port. The common input port is configured by a first beam splitter 222 for receiving the input signal from the major output branch of the first coupler 221 and splitting into two portions each with a substantially 50% split ratio for generating an interference spectrum depending on phase shift between the two waveguide arms. The first beam splitter 222 is a second coupler 222 in 1×2 configuration (see FIG. 6). The common output port is configured by a second beam splitter 223 to combine the two portions of input signal to a combined signal exhibiting interference pattern and to split the combined signal generated by the MZI to a first output signal in a first output branch 224 and a second output signal in a second output branch 225.

In the embodiment shown in FIG. 6, the optical input 211 provides the input signal that carries multiple (n) wavelengths, e.g., $\lambda 1, \lambda 2, \ldots, \lambda n$, where n is an integer >1. As the input signal is coupled into the MZI via the second coupler 222, the first waveguide arm 201, which is also labeled as Arm1, has a single optical path to pass a signal with all the multiple (n) wavelengths. In the embodiment, the second waveguide arm 202, which is also labeled as Arm2, has multiple (n) optical paths denoted respectively by numerals 202-1, 202-2, ..., 202-n. The second waveguide arm 202 also receives a signal with all the multiple (n) wavelengths at least at the beginning portion of the Arm2. Each of the multiple (n) optical paths is independently configured as a delay line with different lengths, L1, L2, ... Ln, and phase shifts. Optionally, each of the multiple (n) optical paths, 202-1, 202-2, ..., 202-n, is made from a same material, for example, a silicon nitride material. Optionally, different optical paths can be made from different materials. The MZI of the apparatus 200 in the present disclosure further includes a first Demultiplexer (DeMux) device 241 disposed in the beginning portion of the second waveguide arm 202 with its multiple (n) output ports respectively connected to the multiple (n) optical paths. The first DeMux device 241 is configured to demultiplex the signal with all the multiple (n) wavelengths into the multiple (n) optical paths allowing a sub-signal only carrying respective one of the multiple (n) wavelengths to be passed in a respective one optical path. Referring to FIG. 6, the first optical path 202-1 passes wavelength $\lambda 1$, the second optical path 202-2 passes wavelength $\lambda 2, \ldots$, and the n-th optical path 202-n passes wavelength $\lambda n$. In the embodiment, each optical path of the second waveguide arm 202 is independently configured with a respective effective refractive index $n_{eff,n}$ and a respective length Ln to meet a corresponding interference condition $m_n \lambda n = n_{eff,n} \cdot Ln - n_{eff,0} \cdot L0$ with respect to the first waveguide arm 201 which is characterized by an effective refractive index $n_{eff,0}$ and a length L0.

Additionally, in the embodiment shown in FIG. 6 with multiple (n) optical paths existed in the second waveguide arm 202, the second beam splitter 223 at the common output port of the MZI is configured as a (n+1)×2 coupler 223 for recombining all of the signals from the first waveguide arm 201 and all of the multiple (n) optical paths of the second waveguide arm 202 and splitting to the first output signal in the first output branch 224 and the second output signal in the second output branch 225 with a split ratio depending on the phase shift between the first waveguide arm 201 and respective one of the multiple (n) optical paths. Optionally, each of the first coupler 221, the second coupler 222, and the third coupler 223 can be any type of coupler including multimode interference coupler or directional coupler, etc.

Again, each of the first output signal and the second output signal carries all the multiple (n) wavelengths, $\lambda 1$ through $\lambda n$, with respective phase shifts. Each optical path is separately optimized to achieve a respective athermal interference condition similar to that described before based on embodiment shown in FIG. 1.

Further in the embodiment shown in FIG. 6, the apparatus 200 includes a second DeMux device 242 disposed in the second output branch to demultiplex the second output signal to multiple (n) output ports respectively carrying the multiple (n) wavelengths. Optionally, the first output branch is connected to a photo detector PD0 232 for reading a power $P_{o0}$ of the first output signal, as shown in FIG. 6. The multiple (n) output ports of the second Demux device 242 are connected respectively to multiple (n) photo detectors, PD1 through PDn (or denoted by numerals 233-1 through 233-n in FIG. 6) for respectively reading powers, $P_{o1}$ through $P_{on}$, of the second output signal respectively associated with for the multiple (n) wavelengths, $\lambda 1$ through $\lambda n$. Optionally, each photo detector, PD0, PD1 through PDn, is a photodiode formed in the silicon photonics substrate. Optionally, each photo detector can be replaced by an edge coupler or a surface grating coupler configured to couple the corresponding output signal to an external detector or power meter disposed not on the silicon photonics substrate shared with the optical chip 20.

In the embodiment, as the optical input provides an input signal with multiple (n) wavelengths, the split portion into the second waveguide arm 202 also contains the multiple (n) wavelengths. It is necessary to demultiplex the signal to n discrete signals with respective wavelengths respectively into the multiple (n) optical paths. Now the MZI essentially has multiple pairs of interference arms with one fixed first waveguide arm 201 with respect to multiple (n) optical paths, 202-1, 202-2, ..., 202-n, in the second waveguide arm 202. This enables the monitoring apparatus 200 to monitor strains at multiple different regions in the optical chip. Similar to the embodiment shown in FIG. 1, each of the multiple (n) optical paths, 202-1 through 202-n, of the second waveguide arm 202 has an optimized length, one of L1 through Ln, to achieve an athermal interference condition with respect to the first waveguide arm 201 of the MZI. Under this design of the MZI, each of the multiple (n) optical paths, 202-1 through 202-n, introduces a differential phase shift associated with one wavelength with the first waveguide arm 201, which is subjected to a change that is primarily induced by a strain/stress distributed/applied along the corresponding optical path disposed to a corresponding designated location on the optical chip 20. Similar to the embodiment in FIG. 1, the distributed strain along any i-th one of the multiple (n) optical paths, i varies from 1 to n, can be monitored by each corresponding power ratio of a power of an i-th output port to the power of input signal, $P_{oi}/P_{in}$, or each corresponding differential power ratio of a power difference between the i-th output port and the first output branch to the power of input signal, $(P_{oi} - P_{o0})/P_{in}$. An advantage of the apparatus 200 is that the second waveguide arm 202 (as delay line) of the MZI has the multiple optical paths 202-1 through 202-n to be respectively disposed at different designated locations in or adjacent to the optical chip 20 so that the apparatus 200 provides direct on-chip monitoring of strains occurring at multiple locations distributed across the optical chip 20.

Figure 7:
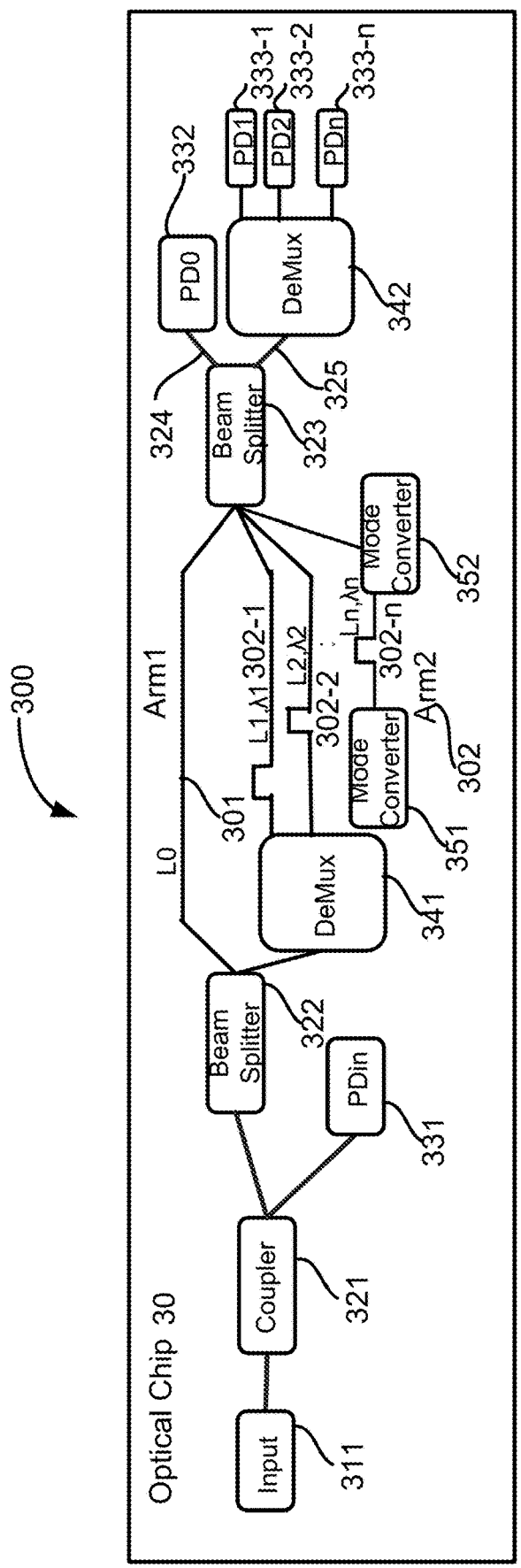
FIG. 7 is a schematic diagram of an apparatus for monitoring strains on an optical chip in silicon photonics platform according to yet another embodiment of the present disclosure.

FIG. 7 is a schematic diagram of an example apparatus for monitoring strains on an optical chip in silicon photonics platform according to yet another embodiment of the present disclosure. As shown, the apparatus 300 for monitoring strains on an optical chip 30 in silicon photonics platform is configured in a silicon photonics substrate shared with the optical chip 30. The apparatus 300 includes an optical input 311 to provide an input signal with multiple (n) wavelengths, a first coupler 321 in 1×2 configuration, a first photodiode PDin 331 and a second coupler 322 connected respectively to two output branches of the first coupler 321. The first photodiode PDin 331 is configured to ascertain a power $P_{in}$ of the input signal from a minor branch of the first coupler 321. The major branch of the first coupler 322 delivers (major portion of) the input signal. The apparatus 300 further includes a MZI having a first waveguide arm 301 and a second waveguide arm 302 as a delay line coupled between a common input port and a common output port. A first beam splitter 322 is configured at the common input port of the MZI as a 1×2 coupler for splitting the input signal to two 50% split signals respectively into the first waveguide arm 301 and the second waveguide arm 302, which are recombined at the common output port to output an interference signal.

In the embodiment shown in FIG. 7, the first waveguide arm 301 has just one optical path and the second waveguide arm 302 has multiple (n) optical paths, 302-1 through 302-n, respectively with different lengths, L1 through Ln. This enables the monitoring apparatus 300 to monitor strains at multiple different regions in the optical chip. One 50% split signal guided into the second waveguide arm 302 from the common input port carries all of the multiple (n) wavelengths and is demultiplexed by a first DeMux device 341 to multiple (n) output ports for passing n demultiplexed signals respectively with the multiple wavelengths λ1 through λn and different phase delays. In at least one of the multiple (n) optical paths, the apparatus 300 further includes a first mode converter 351 disposed at a beginning point of the optical path and a second mode converter 352 disposed at an ending point of the same optical path. The purpose of adding the mode converters here in at least one optical path is to create a special interference arm of the on-chip interferometer which only passes a signal with a designated polarization mode and allows it to gauge the strain distributed along the at least one optical path that is induced only sensitive to the designated polarization mode. The first mode converter 351 is configured to convert a normal TE0 polarization mode of the demultiplexed signal in the corresponding optical path to a designed higher order TM or TE polarization mode. Thus, in the embodiment, the first mode converter 351 in the optical path is configured specifically to convert the corresponding demultiplexed signal in the designated polarization mode. The second mode converter 352 is configured to convert the designated polarization mode back to the TE0 polarization mode before it is recombined at the common output port of the MZI.

The apparatus 300 additionally includes a second beam splitter 323 configured t the common output port of the MZI as a (n+1)×2 coupler to receive all the signals from the first waveguide arm 301 and all of the multiple (n) optical paths in the second waveguide arms 302 and output a first output signal to a first output branch 324 and output a second output signal to a second output branch 325.

Referring to FIG. 7, the apparatus 300 further includes a second photo detector PD0 332 coupled to the first output branch of the common output port to detect a power $P_{o0}$ of the first output signal. Furthermore, the apparatus 300 includes a second DeMux device 342 disposed in the second output branch for demultiplexing the second output signal to multiple (n) demultiplexed signals to multiple (n) output ports, each demultiplexed signal carries a respective one of the multiple (n) wavelengths (λ1 through λn). Moreover, the apparatus 300 includes multiple photo detectors, PD1 through PDn (denoted as 333-1 through 333-n, respectively), respectively coupled to the multiple (n) output ports of a second DeMux 342 to detect powers $P_{o1}$ through $P_{on}$ of the multiple (n) demultiplexed signals associated with the multiple (n) wavelengths (λ1 through λn. Each of the powers $P_{o1}$ through $P_{on}$ of the multiple (n) demultiplexed signals in the second waveguide arm 302 and the power $P_{o0}$ of the first output signal carries respective information about the respective phase shift in corresponding multiple (n) optical paths, 302-1 through 302-n, serving an indication of strain distributed in respective optical paths.

Similar to the embodiment shown in FIG. 6, each of the multiple (n) optical paths, 302-1 through 302-n, of the second waveguide arm 302 is optimized its length, one of L1 through Ln, to achieve an athermal interference condition with respect to the first waveguide arm 301 of the MZI. Under this design, each of the multiple (n) optical paths, 302-1 through 302-n, introduce a differential phase shift associated with one wavelength with the first waveguide arm 301. The differential phase shift is subjected to a change that is primarily induced by a strain/stress distributed/applied along the corresponding optical path disposed to a corresponding designated location on the optical chip 30. In particular, at least one of the multiple (n) optical paths is configured to pass a light signal in one designated polarization mode including higher order guided TE or TM polarization mode. This translates into a function for this optical path to detect a distributed strain that is sensitive only to the designated polarization mode. The distributed strain along any i-th one of the multiple (n) optical paths, i varies from 1 to n, can be monitored by each corresponding power ratio of a power of an i-th output port to the power of input signal, $P_{oi}/P_{in}$, or each corresponding differential power ratio of a power difference between the i-th output port and the first output branch to the power of input signal, $(P_{oi}-P_{o0})/P_{in}$. An advantage of the apparatus 300 is that the second waveguide arm 302 (as delay line) of the MZI has the multiple optical paths 302-1 through 302-n to be respectively disposed at different designated locations in or adjacent to the optical chip 30. The apparatus 300 provides simultaneously monitoring of strains occurring at multiple locations distributed across the optical chip 30 including a strain sensitive to a designated polarization mode including a higher order guided TE or TM polarization mode at a selected location associated with at least one optical path in or adjacent to the optical chip 30.

Figure 8:
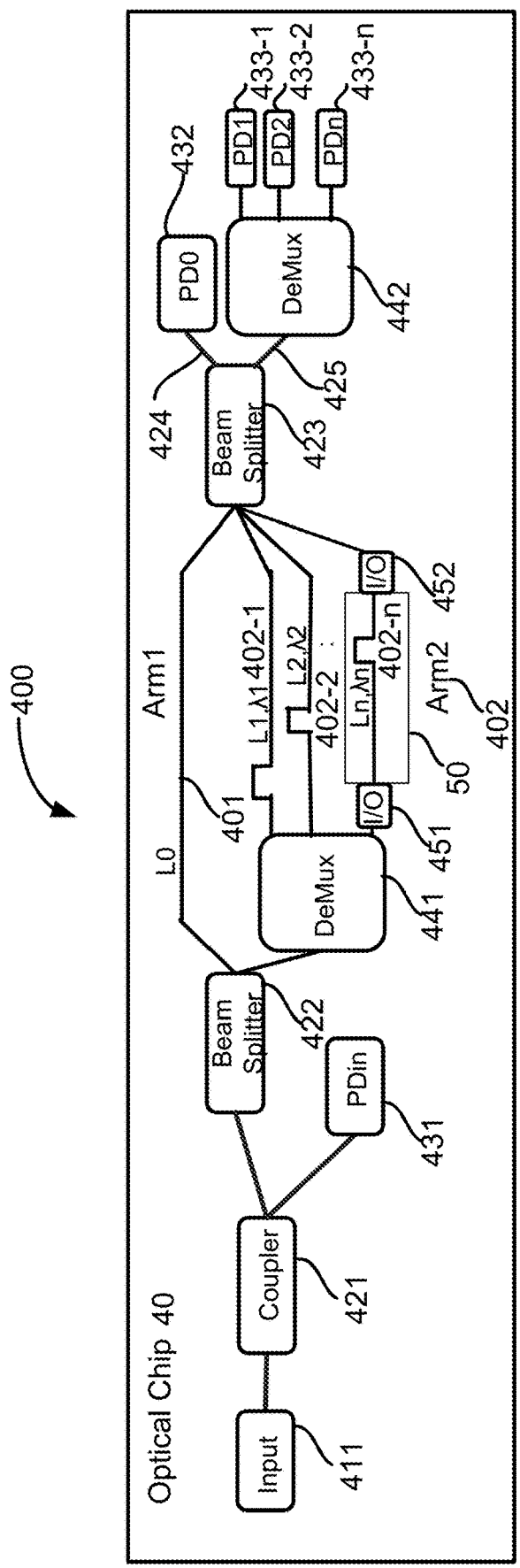
FIG. 8 is a schematic diagram of an apparatus for monitoring strains on an optical chip in silicon photonics platform according to still another embodiment of the present disclosure.

FIG. 8 is a schematic diagram of still another example apparatus for monitoring strains on an optical chip in silicon photonics platform according to still another embodiment of the present disclosure. As shown, the apparatus 400 for monitoring strains on an optical chip 40 in silicon photonics platform is configured in a silicon photonics substrate shared with the optical chip 40. The apparatus 400 includes an optical input 411 to provide an input signal with multiple (n) wavelengths, a first coupler 421 in 1×2 configuration, a first photodiode PDin 431 and a second coupler 422 connected respectively to two output branches of the first coupler 421. The first photodiode PDin 431 is configured to read out a power $P_{in}$ of the input signal from a minor branch of the first coupler 421. The major branch of the first coupler 422 delivers (major portion of) the input signal. The apparatus 400 further includes a MZI having a first waveguide arm 401 and a second waveguide arm 402 as a delay line coupled between a common input port and a common output port. The second coupler 422 is a 1×2 coupler configured as a first beam splitter at the common input port for splitting the input signal to two 50% split signals respectively into the first waveguide arm 401 and the second waveguide arm 402, which are recombined at the common output port to output an interference signal.

In the embodiment shown in FIG. 8, the first waveguide arm 401 has just one optical path and the second waveguide arm 402 has multiple (n) optical paths, 402-1 through 402-n, respectively with different lengths, L1 through Ln. One 50% split signal guided into the second waveguide arm 402 from the common input port carries all of the multiple (n) wavelengths and is demultiplexed by a first DeMux device 441 to multiple (n) output ports for passing n demultiplexed signals respectively with the multiple wavelengths λ1 through λn and different phase delays. At least one of the multiple (n) optical paths of the MZI, for example, 402-n, is not provided in conventional waveguide form but rather as an optical die 50 alternative to the optical chip 40. In other words, the alternative optical die 50 can be totally separated from the optical chip 40 and not formed in the same silicon photonics substrate with the monitoring apparatus 400. The demultiplexed signal with wavelength of λn in this (effective) optical path 402-n represented by the alternative optical die 50 is loaded via a first optical Input/Output (I/O) device 451 and out via a second I/O device 452 to back to the common output port. Thus, in the embodiment, the at least one of the multiple (n) optical paths of the second waveguide arm 402 of the MZI in the apparatus 400 is configured as a special probe for detecting strain variation in the alternative optical die 50 external to the optical chip 40.

The apparatus 400 additionally includes a third coupler 423 configured as a second beam splitter in (n+1)×2 configuration at the common output port of the MZI as to receive all the signals from the first waveguide arm 401 and all of the multiple (n) optical paths including the at least one optical path associated with a corresponding alternative optical die in the second waveguide arms 402 and output a first output signal to a first output branch 424 and output a second output signal to a second output branch 425.

Referring to FIG. 8, the apparatus 400 further includes a second photodiode PD0 432 coupled to the first output branch of the common output port to detect a power $P_{o0}$ of the first output signal. Furthermore, the apparatus 400 includes a second DeMux device 442 disposed in the second output branch for demultiplexing the second output signal to multiple (n) demultiplexed signals to multiple (n) output ports, each demultiplexed signal carrying a respective one of the multiple (n) wavelengths (λ1 through λn). Moreover, the apparatus 400 includes multiple photodiodes, PD1 through PDn (denoted as 433-1 through 433-n, respectively), respectively coupled to the multiple (n) output ports of a second DeMux 442 to detect powers $P_{o1}$ through $P_{on}$ of the multiple (n) demultiplexed signals associated with the multiple (n) wavelengths (λ1 through λn).

Similar to the embodiment shown in FIG. 6, each of the multiple (n) optical paths, 402-1 through 402-n, including the at least one associated with the alternative optical die in the second waveguide arm 402 is optimized with its effective refractive index and length to achieve an athermal interference condition with respect to the first waveguide arm 401 of the MZI. Under this design, each of the multiple (n) optical paths, 402-1 through 402-n, introduce a differential phase shift associated with respective one wavelength with the first waveguide arm 401. The differential phase shift is subjected to a change induced by a strain/stress distributed/applied along the corresponding optical path disposed to a corresponding designated region in the optical chip 40. In particular, the differential phase shift associated with at least one of the multiple (n) optical paths is subjected to a change induced by internal stress of the alternative optical die 50 external to the optical chip 40. This translates into a function for this particular optical path to detect a strain that is distributed only in an alternative or separate optical die outside of the silicon photonics substrate shared with the optical chip 40. In general, the distributed strain along any i-th one of the multiple (n) optical paths, i varies from 1 to n, can be monitored by each corresponding power ratio of a power of an i-th output port to the power of input signal, $P_{oi}/P_{in}$, or each corresponding differential power ratio of a power difference between the i-th output port and the first output branch to the power of input signal, $(P_{oi}-P_{o0})/P_{in}$. An advantage of the apparatus 400 is that the second waveguide arm 402 (as delay line) of the MZI has the multiple optical paths 402-1 through 402-n to respectively disposed at different designated locations on the optical chip 40. The apparatus 400 provides simultaneously monitoring of distributed strains on multiple designated locations on the optical chip 40 including a strain induced by an alternative optical die at a particular location on the optical chip 40 in silicon photonics platform.

While the above is a full description of the specific embodiments, various modifications, alternative constructions and equivalents may be used. Therefore, the above description and illustrations should not be taken as limiting the scope of the present disclosure which is defined by the appended claims.

What is claimed is:

1. An apparatus for monitoring strain in an optical chip in a silicon photonics platform comprising:
    a silicon photonics substrate shared with the optical chip;
    an optical input configured in the silicon photonics substrate to supply an input signal of a single wavelength;
    a first waveguide arm and a second waveguide arm embedded in the silicon photonics substrate to form an on-chip interferometer, the second waveguide arm forming an optical delay line and being disposed at a region in or adjacent to the optical chip, the on-chip interferometer being configured to (i) split the input signal into a first input signal in the first waveguide arm and a second input signal in the second waveguide arm, (ii) combine the first input signal and the second input signal into a combined signal exhibiting an interference pattern indicative of strain at the region in the optical chip.

2. The apparatus of claim 1, further comprising a first 1×2 coupler having one input and two outputs and a first photo detector configured in the silicon photonics substrate, the input being operationally connected to the optical input to receive the input signal, a first one of the two outputs being a minor output operationally connected to the first photo detector for measuring a power of $P_{in}$ of the input signal and a second one of the two outputs being a major output to deliver the input signal of the single wavelength.

3. The apparatus of claim 2, wherein the minor output is operationally connected to a grating coupler configured to be accessed by a power meter external to the silicon photonics substrate for measuring the power of $P_{in}$ of the input signal.

4. The apparatus of claim 3, further comprising a second 1×2 coupler being configured as an input beam splitter of the on-chip interferometer for splitting the input signal from the major output of the first 1×2 coupler respectively to the first input signal in the first waveguide arm and the second input signal in the second waveguide arm with a substantially ~50% split ratio.

5. The apparatus of claim 4, further comprising a third coupler being a 2×2 coupler configured as an output beam splitter of the on-chip interferometer that is configured to receive the first input signal from the first waveguide arm and to receive the second input signal from the second waveguide arm to form the combined signal and to output a first output signal in a first output branch and to output a second output signal in a second output branch, both the first output signal and the second output signal depending on the interference pattern caused by a phase shift between the first input signal and the second input signal.

6. The apparatus of claim 5, further comprising a second photo detector coupled to the first output branch to measure a power of $P_{o0}$ of the first output signal and a third photo detector coupled to the second output branch to measure a power of $P_{o1}$ of the second output signal, wherein the apparatus outputs an indication of strain that is distributed along the second waveguide arm at the region in or adjacent to the optical chip.

7. The apparatus of claim 5, wherein the first output branch and the second output branch respectively are connected to two surface grating couplers configured to be accessed by power meters external to the silicon photonics substrate for respectively measuring the power of $P_{o0}$ of the first output signal and the power of $P_{o1}$ of the second output signal.

8. The apparatus of claim 1, wherein the first waveguide arm comprises a silicon-based waveguide of a first length and the second waveguide arm comprises a SiN-based waveguide of a second length disposed closer to the optical chip than the first waveguide arm, the second length being selected to achieve an athermal interference condition at the single wavelength of the input signal with respective to the silicon-based waveguide of the first length so that a phase shift between the first input signal in the first waveguide arm and the second input signal in the second waveguide arm of the on-chip interferometer is temperature independent.

9. The apparatus of claim 1, wherein the optical input comprises a surface grating coupler or edge coupler configured to couple with a single wavelength light source.

10. A method for monitoring strain in an optical chip in a silicon photonics platform comprising:
preparing a silicon photonics substrate for integrating the optical chip;
configuring an optical input in the silicon photonics substrate to supply an input signal of a single wavelength;
embedding a first waveguide arm and a second waveguide arm at least partially in the silicon photonics substrate to form an on-chip interferometer, the second waveguide arm forming an optical delay line and being disposed at a region in or adjacent to the optical chip, the on-chip interferometer being configured to (i) split the input signal into a first input signal in the first waveguide arm and a second input signal in the second waveguide arm, (ii) combine the first input signal and the second input signal into a combined signal exhibiting an interference pattern indicative of strain at the region in the optical chip.

11. The method of claim 10, further comprising forming a first 1×2 coupler having one input and two outputs and forming a first photo detector configured in the silicon photonics substrate, the input being operationally connected to the optical input to receive the input signal, a first one of the two outputs being a minor output operationally connected to the first photo detector for measuring a power of $P_{in}$ of the input signal and a second one of the two outputs being a major output to deliver the input signal of the single wavelength.

12. The method of claim 11, wherein forming the first 1×2 coupler further comprises connecting the minor output operationally to a grating coupler configured to be accessed by a power meter external to the silicon photonics substrate for measuring the power of $P_{in}$ of the input signal.

13. The method of claim 12, further comprising forming a second 1×2 coupler configured as an input beam splitter of the on-chip interferometer for splitting the input signal from the major output of the first 1×2 coupler respectively to the first input signal in the first waveguide arm and the second input signal in the second waveguide arm with a substantially ~50% split ratio.

14. The method of claim 13, further comprising forming a third 2×2 coupler configured as an output beam splitter of the on-chip interferometer that is configured receive the first input signal from the first waveguide arm and to receive the second input signal from the second waveguide arm to form the combined signal and to output a first output signal in a first output branch and to output a second output signal in a second output branch, both the first output signal and the second output signal depending on the interference pattern caused by a phase shift between the first input signal and the second input signal.

15. The method of claim 14, further comprising coupling a second photo detector to the first output branch to measure a power of $P_{o0}$ of the first output signal, coupling a third photo detector to the second output branch to measure a power of $P_{o1}$ of the second output signal, and using a ratio of $P_{o1}/P_{in}$ or $(P_{o1}-P_{o0})/P_{in}$ to output an indication of strain that is distributed along the second waveguide arm at the region in or adjacent to the optical chip.

16. The method of claim 14, further comprising connecting the first output branch and the second output branch respectively to two surface grating couplers configured to be accessed by power meters external to the silicon photonics substrate for respectively measuring the power of $P_{o0}$ of the first output signal and the power of $P_{o1}$ of the second output signal.

17. The method of claim 10, wherein embedding the first waveguide arm comprises forming asilicon-based waveguide of a first length by etching and embedding the second waveguide arm comprises forming a SiN-based waveguide of a second length disposed closer to the optical chip than the first waveguide arm, the second length being selected to achieve an athermal interference condition at the single wavelength of the input signal with respective to the silicon-based waveguide of the first length so that a phase shift between the first input signal in the first waveguide arm and the second input signal in the second waveguide arm of the on-chip interferometer is temperature independent.

18. The method of claim 10, wherein configuring the optical input comprises forming a surface grating coupler or edge coupler in the silicon photonics substrate to couple with a single wavelength light source.

* * * * *